United States Patent
Kuo et al.

(10) Patent No.: US 9,147,232 B1
(45) Date of Patent: Sep. 29, 2015

(54) REDUCING HALO ARTIFACTS IN ELECTROPHOTOGRAPHIC PRINTING SYSTEMS

(71) Applicants: Chung-Hui Kuo, Fairport, NY (US); Horia Neamtu, Webster, NY (US)

(72) Inventors: Chung-Hui Kuo, Fairport, NY (US); Horia Neamtu, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 14 days.

(21) Appl. No.: 14/225,476

(22) Filed: Mar. 26, 2014

(51) Int. Cl.
| | |
|---|---|
| *G06T 5/20* | (2006.01) |
| *G06T 7/00* | (2006.01) |
| *H04N 1/409* | (2006.01) |
| *H04N 1/29* | (2006.01) |
| *G06K 15/14* | (2006.01) |
| *G03G 13/00* | (2006.01) |
| *G06T 5/00* | (2006.01) |
| *G06T 5/30* | (2006.01) |
| *G06T 7/40* | (2006.01) |
| *G03G 15/00* | (2006.01) |
| *G06K 15/02* | (2006.01) |

(52) U.S. Cl.
CPC ............... *G06T 5/003* (2013.01); *G03G 15/55* (2013.01); *G06K 15/14* (2013.01); *G06K 15/1871* (2013.01); *G06T 5/30* (2013.01); *G06T 7/0085* (2013.01); *G06T 7/408* (2013.01); *H04N 1/295* (2013.01); *H04N 1/4092* (2013.01); *G06T 2207/20024* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 5,252,995 A * | 10/1993 | Trask et al. | 358/300 |
| 6,606,470 B1 | 8/2003 | Wibbels et al. | |
| 6,919,973 B1 * | 7/2005 | Meyer et al. | 358/3.26 |
| 6,970,258 B1 * | 11/2005 | Meyer et al. | 358/1.11 |
| 7,016,073 B1 | 3/2006 | Meyer et al. | |
| 7,085,003 B1 * | 8/2006 | Belkhir | 358/1.9 |
| 7,974,544 B2 | 7/2011 | Kobayashi et al. | |
| 2009/0214238 A1 | 8/2009 | Tanaka et al. | |
| 2011/0235063 A1 | 9/2011 | Kondo | |

* cited by examiner

*Primary Examiner* — Scott A Rogers
(74) *Attorney, Agent, or Firm* — Kevin E. Spaulding

(57) ABSTRACT

A method for processing an input image to reduce halo artifacts in an electrophotographic printing system. The input image is automatically analyzed to determine an edge map image indicating light-side edge regions that include edge pixels that are adjacent to edge transitions in the input image and are on a lighter side of the edge transition. At least one edge region dilation operation to the edge map image to expand the light-side edge regions in a direction away from the edge transitions. A corrected image is formed by modifying the input pixels of the input image corresponding to the expanded light-side edge regions to determine corrected pixels having corrected pixel values. The corrected image is then printed using the electrophotographic printing system.

18 Claims, 15 Drawing Sheets

| 1/25 | 1/25 | 1/25 | 1/25 | 1/25 |
|------|------|------|------|------|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |

317: [0.1154 | 0.1415 | 0.1599 | 0.1666 | 0.1599 | 0.1415 | 0.1154] (vertical)

FIG. 7B

|  |  |  |  |  |
|---|---|---|---|---|
| -1 | -1 | -1 | -1 | -1 |
| -1 | 1 | 2 | 1 | -1 |
| -1 | 2 | 4 | 2 | -1 |
| -1 | 1 | 2 | 1 | -1 |
| -1 | -1 | -1 | -1 | -1 |

REDUCING HALO ARTIFACTS IN ELECTROPHOTOGRAPHIC PRINTING SYSTEMS

FIELD OF THE INVENTION

This invention pertains to the field of artifact reduction for electrophotographic printing, and more particularly to a method for reducing halo artifacts.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multi-color print image on the receiver.

Electrophotographic printing systems are susceptible to various printing artifacts where the tone reproduction exhibits certain spatial-dependent or temporal-dependent characteristics. For instance, "streak" artifacts can be formed when the tone reproduction of a printing system exhibits spatial variation across the image width. Likewise, "banding" artifacts can be formed when the tone reproduction exhibits temporal variations. Methods to compensate for such artifacts are known in the art and typically involve characterizing the form of the artifacts and introducing compensating modifications to the input images, or the exposure used to print the input images.

Another type of artifact can be formed when tone reproduction variations are caused by the interaction between neighboring imaging pixels. For example, in the electrophotographic printing process, the electric field produced in the uniformly charged area is different from that formed from an area having the same charge in the neighborhood of an image edge. This phenomenon is sometimes referred to as a "fringe field effect," and the resulting artifacts are sometimes called "halo artifacts" or "fringe artifacts." Halo artifacts are typically most noticeable in the mid-tone region where the fringe fields generally cause less colorant to be deposited on the receiver media on the lighter side of an image edge than would be deposited in uniform image areas. Similarly, the fringe fields can cause more colorant to be deposited on the receiver media on the darker side of an image edge than would be deposited in uniform image areas. The magnitude of the halo artifacts will vary as a function of the size of the image edge, as well as the coverage levels on both sides of the edge. Generally, the tone reproduction will return to normal behavior for a full strength edge which transitions between an area of 0 percent colorant coverage to an area of 100 percent colorant coverage. The halo artifacts can be characterized as image-dependent tone reproduction variations, where the tone reproduction curve effectively varies as a function of image position.

U.S. Pat. No. 6,606,470 to Wibbels et al., entitled "Color plane partial exposure for reducing edge effects," discloses a method for reducing edge artifacts in an electrophotographic imaging system. The method includes partially exposing an image region that does not include a color, while normally exposing an adjacent region that includes a color. This reduces lateral electric field effects and the associated edge artifacts.

U.S. Pat. No. 7,016,073 to Meyer et al., entitled "Digital halftone with auxiliary pixels," discloses a method for reducing halo artifacts that can occur around halftone dots. The method includes adding small auxiliary pixels around the boundary of the halftone dots to modify the fringe field effect. The size of the auxiliary pixels is chosen to be small enough so that they embody frequencies that are beyond the MTF of the printing system, and therefore will not result in toner deposition.

U.S. Pat. No. 7,974,544 to Kobayashi et al., entitled "Electrophotography apparatus having edge detection of toner patch and exposure control," discloses a method to reduce edge artifacts in an electrophotographic printer. The method compares an image region to predefined templates to identify edge regions. A corrected amount of toner is provided in the identified edge regions based on measurements made for a set of test patches.

U.S. Patent Application Publication 2009/0214238 to Tanaka et al., entitled "Image forming apparatus, image forming method, and image forming program product," discloses a method for adjusting edge characteristics in a printed image. The method includes comparing a neighborhood of image pixels to a set of reference patterns. The image pixels are modified to produce various effects such as line thinning and line thickening.

U.S. Patent Application Publication 2011/0235063 to Kondo, entitled "Image processing apparatus," discloses a method for reducing toner consumption in an electrophotographic printer. The method includes analyzing the image to determine an index value relating to an edge intensity around a target pixel. For high edge intensity pixels, the print density is increased, and for low edge intensity pixels, the print density is decreased.

Accordingly, there remains a need for an improved method to efficiently correct for halo artifacts in an electrophotographic printing system.

SUMMARY OF THE INVENTION

The present invention represents a method for reducing halo artifacts in an electrophotographic printing system, the method implemented at least in part by a data processing system and comprising:

receiving an input image including a plurality of input pixels having input pixel values;

automatically analyzing the input image to determine an edge map image indicating light-side edge regions that include edge pixels that are adjacent to edge transitions in the input image and are on a lighter side of the edge transition;

performing at least one edge region dilation operation to the edge map image to expand the light-side edge regions in a direction away from the edge transitions;

forming a corrected image by modifying the input pixels of the input image corresponding to the expanded light-side edge regions to determine corrected pixels having corrected pixel values; and printing the corrected image using the electrophotographic printing system.

This invention has the advantage that the visibility of halo artifacts caused by fringe field effects in electrophotographic printing can be substantially reduced.

It has the additional advantage that the computations necessary to determine the corrected image can be performed efficiently so that the process can be implemented by a processor in the electrophotographic printing system in real time.

It has the further advantage that dilation operations provide adjusted edge regions having consistent widths that can be controlled according to the characteristics of the halo artifacts associated with a particular printing configuration.

BRIEF DESCRIPTION OF THE DRAWINGS

FIG. 7A illustrates an exemplary blur filter for use with the filter image step of FIG. 5;

FIG. 7B illustrates an exemplary separable blur filter for use with the filter image step of FIG. 5;

FIG. 7C illustrates an exemplary high-pass filter for use with the filter image step of FIG. 5;

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
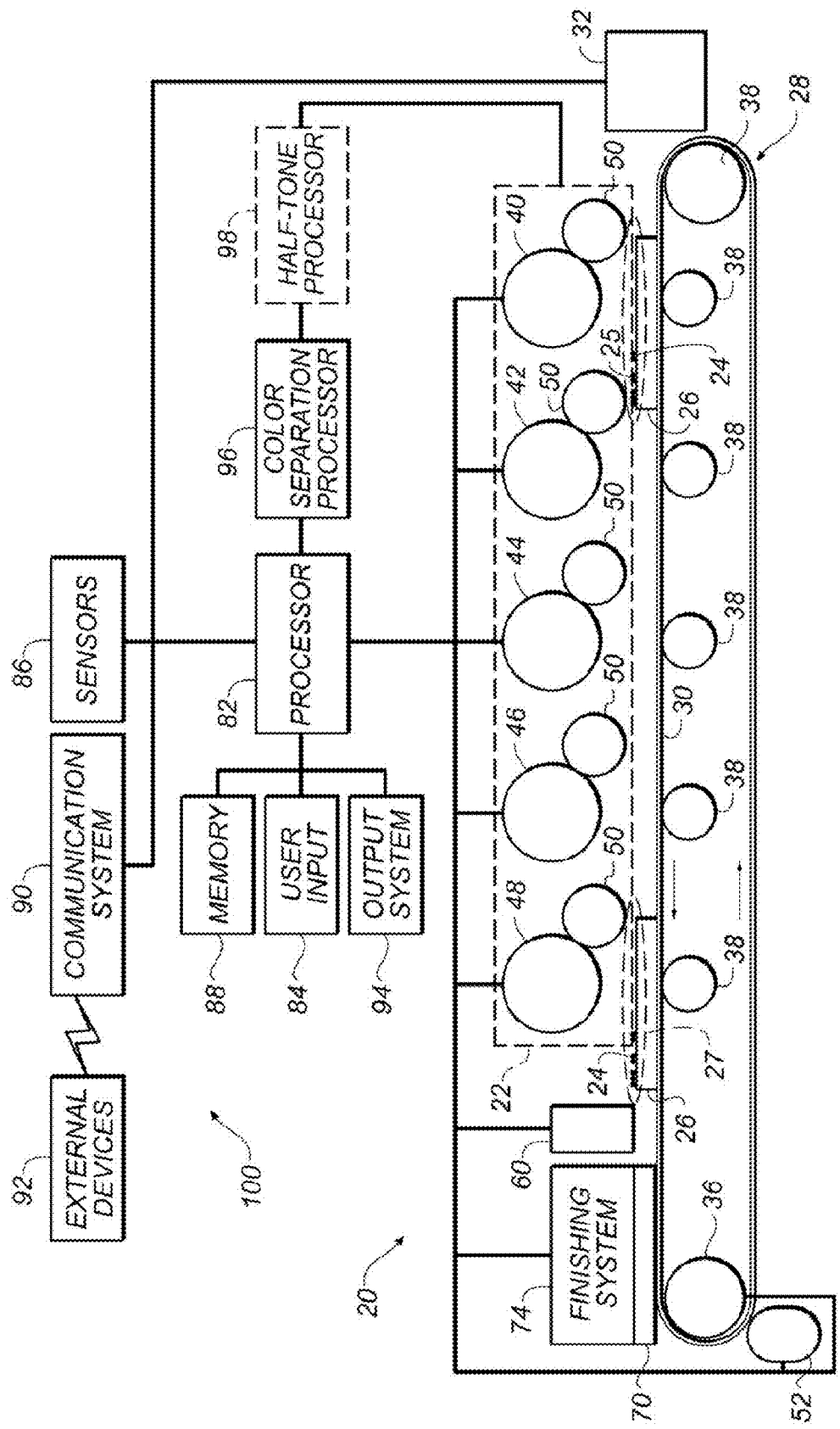
FIG. 1 illustrates a first embodiment of a toner printer.

FIG. 1 is a system level illustration of one embodiment of an exemplary toner printer 20 which uses an electrophotographic process to produce printed images. In the embodiment of FIG. 1, toner printer 20 has a print engine 22 that deposits toner 24 onto a receiver 26 to form a toner image 25 in the form of a patterned arrangement of toner stacks. Toner image 25 can include any pattern of toner 24 and can be mapped according to image data representing text, graphics, photo, and other types of visual content, as well as patterns that are determined based upon desirable structural or functional arrangements of the toner 24.

Toner 24 is a material or mixture that contains toner particles and that can develop on an imaging member having an electrostatic latent image. Examples of such an imaging member include a photoreceptor, photoconductor, or electrostatically charged surface. Particles of toner 24 have at least two components, a generally transparent binder material and colorant particles that cause the toner particles to have a particular color.

Typically, toner 24 has reflective colorant particles (e.g., pigments or dyes) disbursed within the toner binder material. The reflective colorant particles absorb and reflect selected wavelengths of an ambient light to cause light that is reflected by the colorant particles to have a reflective toner color. These particles are generally referred to herein as reflective toner particles.

Toner 24 can also include so called fluorescent toner particles that have a binder material with fluorescent colorant particles therein. Fluorescent colorant particles absorb and can reflect visible light similarly to reflective toner particles. Fluorescent colorant particles also absorb invisible wavelengths of light such as infra-red and ultra-violet light and convert this absorbed light into a light that is emitted from the fluorescent colorant particles. This allows such fluorescent colorant particles to appear to provide greater brightness than reflective toner colors having a comparable color. Examples of such fluorescent colorant particles will be described in greater detail below.

Additionally, it is known to provide particles of toner 24 with little or no colorant therein. When fused, such clear particles have the appearance of being transparent, or, while being generally transparent, can impart some amount of coloration or opacity. Such clear toner particles can provide, for example, a protective layer on an image or can be used to create other effects and properties on the image. Such clear toner particles can also be used to produce a more uniform gloss to the printed image.

Toner particles can have a range of diameters (e.g. less than 4 um, on the order of 5-15 μm, up to approximately 30 μm, or larger). When referring to particles of toner 24, the toner size or diameter is defined in terms of the mean volume weighted diameter as measured by conventional diameter measuring devices such as a Coulter Multisizer, sold by Coulter, Inc. The mean volume weighted diameter is the sum of the volume of each toner particle multiplied by the diameter of a spherical particle of equal volume, divided by the total particle volume. Toner 24 is also referred to in the art as marking particles or dry ink. In certain embodiments, toner 24 can also comprise particles that are entrained in a liquid carrier.

Typically, receiver 26 takes the form of paper, film, fabric, metalized or metallic sheets or webs. However, receiver 26 can take any number of forms and can comprise, in general, any article or structure that can be moved relative to print engine 22 and processed as described herein.

Print engine 22 has one or more printing modules (shown in FIG. 1 as printing modules 40, 42, 44, 46, and 48) that are each used to deliver a single application of toner 24 to form the toner image 25 on receiver 26. For example, the toner image 25 shown formed on the right-hand receiver 26 shown in FIG. 1 can provide a monochrome image, or a layer of a structure or other functional material or shape.

Print engine 22 and a receiver transport system 28 cooperate to cause one or more toner image 25 to be provided in registration to form a composite toner image 27 such as the composite toner image 27 shown in FIG. 1 as being formed on the left-hand receiver 26. Composite toner image 27 can be used for any of a plurality of purposes, the most common of which is to provide a printed image with more than one color. For example, in a four color image, four toner images are formed with each toner image having one of four primary colors: cyan, magenta, yellow, and black. These four toner colors can be combined to form a representative color gamut. Similarly, in a five color image various combinations of any of five differently colored toners can be combined to form a color print on receiver 26. That is, any of the five colors of toner 24 can be combined with toner 24 of one or more of the other colors at a particular location on receiver 26 to form a color after a fusing or fixing process that is different than the colors of the toners 24 applied at that location.

In FIG. 1, print engine 22 is illustrated with five printing modules 40, 42, 44, 46, and 48, arranged along a length of receiver transport system 28. Each printing module delivers a single toner image 25 to a respective transfer subsystem 50 in accordance with a desired pattern. The respective transfer subsystem 50 transfers the toner image 25 onto receiver 26 as it is moved by receiver transport system 28 past the transfer subsystem 50. Receiver transport system 28 comprises a movable surface 30 that positions receiver 26 relative to printing modules 40, 42, 44, 46, and 48. In this embodiment, movable surface 30 is illustrated in the form of an endless belt that is moved by motor 36, that is supported by rollers 38. However, in other embodiments receiver transport system 28 can take other forms and can be provided in segments that operate in different ways or that use different structures. In an alternate embodiment, not shown, printing modules 40, 42, 44, 46 and 48 can each deliver a single application of toner 24 to a common transfer subsystem 50 to form a composite toner image 27 thereon which can be transferred to receiver 26. As is also shown in FIG. 1, a cleaning system 52 can be provided to clean movable surface 30.

Print engine 22 can cause a single pattern of toner 24 to be transferred to receiver 26 to form a toner image 25 as receiver 26 is moved by receiver transport system 28 relative to print engine 22. Where more than one toner image 25 is transferred onto receiver 26 in registration, a composite toner image 27 is formed. In such a composite toner image 27, different types of toner are combined at individual locations on the receiver 26. The toner colors transferred to receiver 26 are combined during fusing to form a single combination color at each location of a receiver, to provide different combinations of properties, or for other purposes. For example, in a four color image, four toners having primary colors, cyan, magenta, yellow and black, can be combined to form any of a plurality of combination colors in a four-color color gamut. Similarly, in a five color image various combinations of any of five toner colors can be combined at individual locations on receiver 26 to form any of a plurality of combination colors in a five-color color gamut.

Typically, the addition of the fifth toner is used to increase the color gamut available for printing as compared to a color gamut available using four toners for printing. However, the fifth toner can also be a specialty color toner or spot color, such as for making proprietary logos or colors that cannot be produced repeatedly or accurately with only reflective type colorants used (e.g., cyan, magenta, yellow and black toner colors). Other toners such as those that provide metallic or pearlescent colors, or a clear toner or tinted toner can also be supplied by way of a fifth printing module. Tinted toners absorb less light than they transmit, but do contain pigments or dyes that modify the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

The fifth color can also include a fluorescent toner color that can be used as described herein to reduce noise levels in a toner print.

As is also shown in the embodiment of FIG. 1, printer 20 includes a fuser 60. Fuser 60 can take any variety of forms and can include, for example, a heated fusing roller and opposing pressure roller, a noncontact fusing system, and a solvent based fusing system. Such fusing systems can be used in modes that fuse toner images 25 to receiver 26 or that fix the toner images 25 to the receiver 26 as is known in the art. In other embodiments, other known systems for causing toner images 25 to adhere to receiver 26 can be used as are also known in the art. In the example illustrated in FIG. 1, receiver transport system 28 advances receiver 26 past the fuser 60 after the composite toner image 27 has been formed thereon. This yields a toner print 70. Receiver transport system 28 then advances receiver 26 to an optional finishing system 74 that can perform any of a wide variety of finishing operations on the toner print 70.

Printer 20 is operated by printer processor 82 that controls the operation of print engine 22, receiver transport system 28, receiver delivery system 32, and transfer subsystems 50, to form, for example, a composite toner image 27 on receiver 26 and to cause fuser 60 to fuse the composite toner image 27 onto receiver 26 to form toner prints 70 as described herein or as is otherwise known in the art.

Printer processor 82 can take any of a variety of forms and can comprise for example, and without limitation a mainframe, server, or personal computer, a digital microprocessor, logic control device, programmable logic controller, a programmable analog device, or a hardwired arrangement of circuits and/or circuit components that can perform the functions described herein.

Printer processor 82 operates printer 20 based upon input signals from a user input system 84, sensors 86, a memory 88 and a communication system 90. User input system 84 can comprise any form of transducer or other device capable of detecting conditions that are indicative of an action of a user and converting this input into a form that can be used by printer processor 82. For example, user input system 84 can comprise a touch screen input, a touch pad input, a 4-way switch, a 6-way switch, an 8-way switch, a stylus system, a trackball system, a joystick system, a voice recognition system, a gesture recognition system or other such systems.

An output system 94 can comprise for example, and without limitation, a display, audio signal source or tactile signal generator or any other device that can be used by printer processor 82 to provide human perceptible signals for feedback, informational or other purposes.

Sensors 86 can include contact, proximity, magnetic or optical sensors, or other sensors known in the art that can be used to detect conditions in printer 20, or in the environment surrounding printer 20, and to convert this information into a form that can be used by printer processor 82 in governing printing, fusing, finishing or other functions.

Memory 88 can comprise any form of conventionally known memory devices including but not limited to optical, magnetic or other movable media as well as semiconductor or other forms of electronic memory. Memory 88 can be fixed within printer 20 or removable from printer 20 at a port, memory card slot or other known means for temporarily connecting a memory 88 to an electronic device. Memory 88 can also be connected to printer 20 by way of a fixed data path or by way of communication system 90.

Communication system 90 can comprise any form of circuit, system or transducer that can be used to send signals to or receive signals from memory 88 or external devices 92 that are separate from or separable from direct connection with printer processor 82. Communication system 90 can connect to external devices 92 by way of a wired or wireless connection. In certain embodiments, communication system 90 can comprise any circuit that can communicate with one of external devices 92 using a wired connection such as a local area network, a point-to-point connection, or an Ethernet connection. In certain embodiments, communication system 90 can alternatively, or in combination, provide wireless communication circuits for communication with separate or separable devices using, for example, wireless telecommunication or wireless protocols such as those found in the Institute of Electronics and Electrical Engineers Standard 802.11 or any other known wireless communication systems. Such systems can be networked or can use point to point communication.

External devices 92 can comprise any type of electronic system that can generate signals bearing data that may be useful to printer processor 82 for operating printer 20. For example, external devices 92 can include, but are not limited to, mainframe and personal computers, portable computing devices, digital graphic processing systems, and any form of general-purpose or special-purpose digital computing device that can perform the functions described herein. In one embodiment an external device can be what is known in the art as a digital front end (DFE), which is a computing device that can be used to provide an external source of a print order that has image information and, optionally, printing instructions including printing information from which the manner in which the images are to be printed can be determined. Optionally, the printing instructions can include finishing information that defines how prints made according to the print order are to be processed after printing. A print order that is generated by such external devices 92 is received at communication system 90 which in turn provides appropriate signals to the printer processor 82 or other system components.

Similarly, the print order, or portions thereof, including image and production data, can be obtained from any other source that can provide such data to printer 20 in any other manner, including, but not limited to, memory 88 or communication system 90. Further, in certain embodiments image data or production data or certain aspects thereof can be generated from a source at printer 20 (e.g., by printer processor 82) such as by way of remote input (e.g., input received over communication system 90) or local input (e.g., input received using user input system 84 and output system 94). For convenience, these sources are referred to collectively herein as source of print order information 100. It will be appreciated, that this is not limiting and that source of print order information 100 can comprise any electronic, magnetic, optical or other system known in the art of printing that can be incorporated into printer 20 or that can cooperate with printer 20 to make print order information or parts thereof available.

In the embodiment of printer 20 that is illustrated in FIG. 1, printer processor 82 has a color separation processor 96 to convert the image data into color separation image data that can be used by printing modules 40, 42, 44, 46, 48 of print engine 22 to generate color separation images. An optional halftone processor 98 is also shown that can process the color separation images according to any half-tone screening requirements of print engine 22. In some embodiments, printer processor 82 can be used to perform the functions of generating color separation images. In still other embodiments, external devices such as external computers and DFEs can be used to generate color separation images. Conventional color separation techniques can be used for this purpose including raster image processing.

Figure 2A:
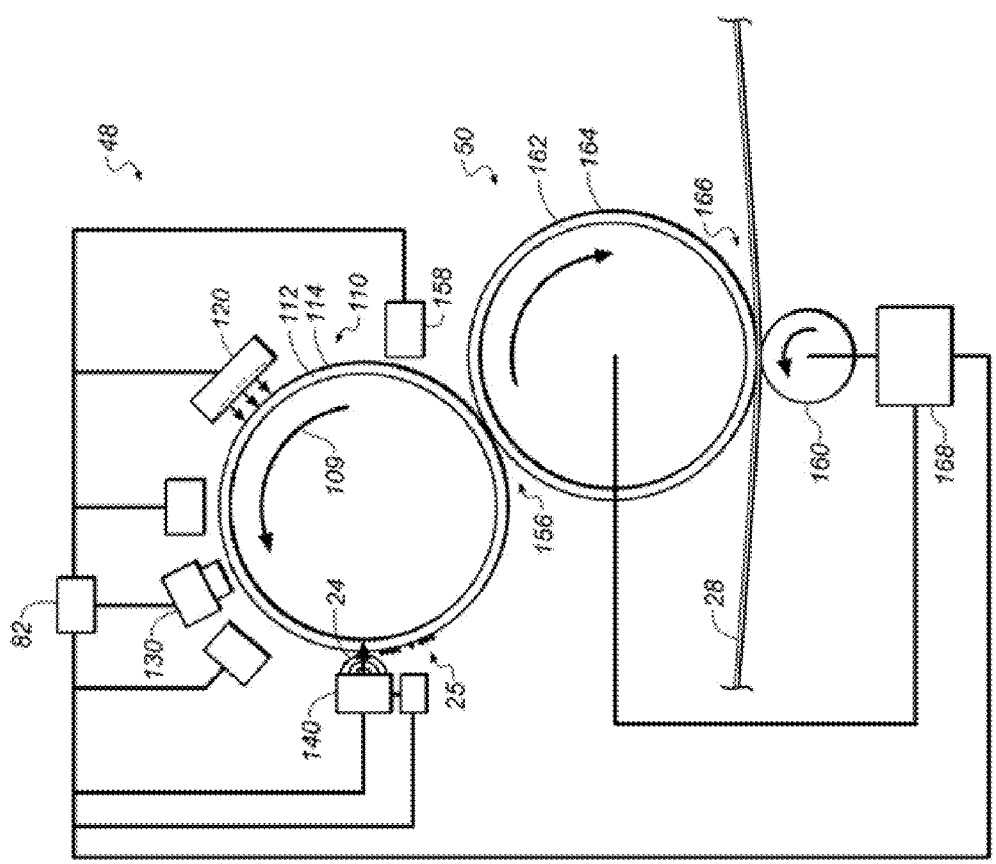
FIGS. 2A-2C illustrate the operation of one embodiment of a printing module.
Figure 2B:
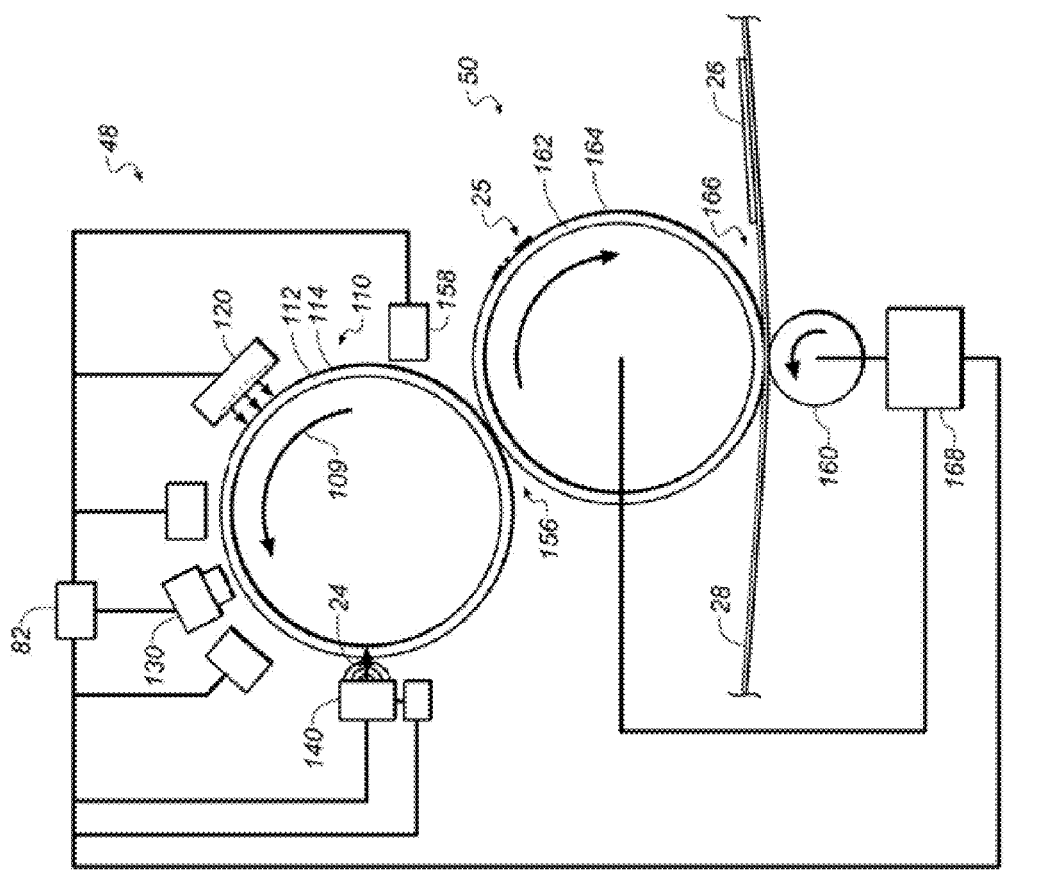
Figure 2C:
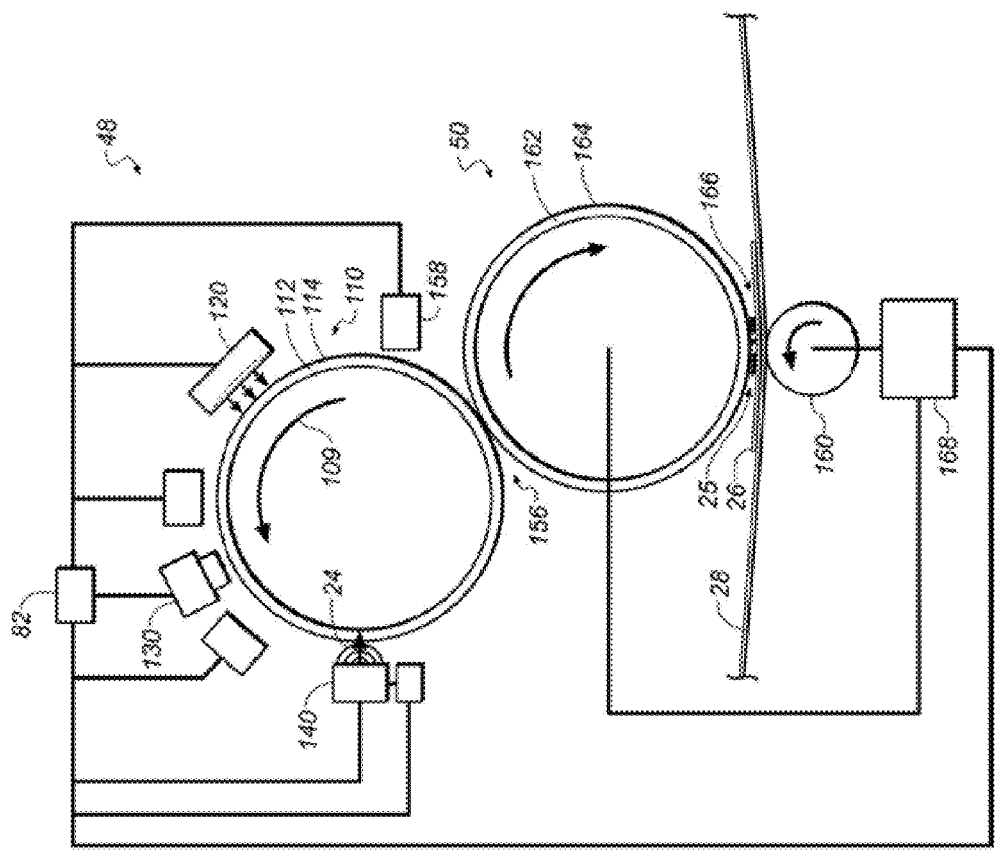

FIGS. 2A-2C illustrate a first embodiment of a printing module 48 that is representative of printing modules 40, 42, 44 and 46 of FIG. 1. In this embodiment, printing module 48 has a primary imaging system 110, a charging subsystem 120, a writing system 130 and a development system 140 that are each ultimately responsive to the printer processor 82.

Primary imaging system 110 includes a primary imaging member 112. In the embodiment of FIGS. 2A-2C, primary imaging member 112 takes the form of an imaging cylinder. However, in other embodiments, primary imaging member 112 can take other forms, such as a belt or plate.

Primary imaging system 110 has a surface 114 on which a pattern of charge can be formed. In the embodiment of FIGS. 2A-2C, surface 114 is a photoreceptor having a charge retentive surface on which a pattern of charge can be applied and further having a photosensitive layer that can locally discharge a charge on the surface as a function to an amount of light to which the charge retentive surface is exposed.

As is indicated by arrow 109 in FIGS. 2A-2C, primary imaging member 112 is rotated by a motor (not shown) such that primary imaging member 112 rotates from charging subsystem 120 where a uniform charge is imparted onto primary imaging member 112, to writing system 130 which selectively discharges the primary imaging member 112 to form a latent electrostatic image on primary imaging member 112. Primary imaging member 112 is then rotated past development system 140 where a charged toner 24 is exposed to the latent electrostatic image in the presence of a development field causing charged toner 24 to leave development system 140 and develop on the primary imaging member 112 to form a toner image 25 corresponding to the latent electrostatic image.

Continued rotation of primary imaging member 112 brings the toner image into a transfer nip 156 associated with transfer subsystem 50 where the toner image 25 is transferred to a transfer surface 164 on a co-rotating intermediate transfer member 162. Further rotation of primary imaging member 112 moves the primary imaging member 112 past a cleaning subsystem 158 and back to the charging subsystem 120.

As is shown in FIG. 2B, rotation of intermediate transfer member 162 moves the transferred toner image 25 toward a transfer nip 166 while receiver transport system 28 advances receiver 26 toward transfer nip 166. As is shown in FIG. 2C, when both toner image 25 and receiver 26 are in transfer nip 166, the print image 25 is transferred from transfer surface 164 of intermediate transfer member 162 to the receiver 26. In some embodiments, a cleaning subsystem (not shown in FIG. 2C), analogous to cleaning subsystem 158, can be provided to clean the transfer surface 164 after the print image 25 has been transferred to the receiver 26.

In this embodiment, transfer subsystem 50 includes a transfer backup member 160 opposite to intermediate transfer member 162 at transfer nip 166. Intermediate transfer member 162 optionally has a resilient support (not shown) for transfer surface 164. As is further shown in the embodiments of FIGS. 2A-2C a transfer power supply 168 is provided to create a transfer field between intermediate transfer member 162 and transfer backup member 160 to facilitate the transfer of the toner image 25 onto receiver 26.

Figure 3:
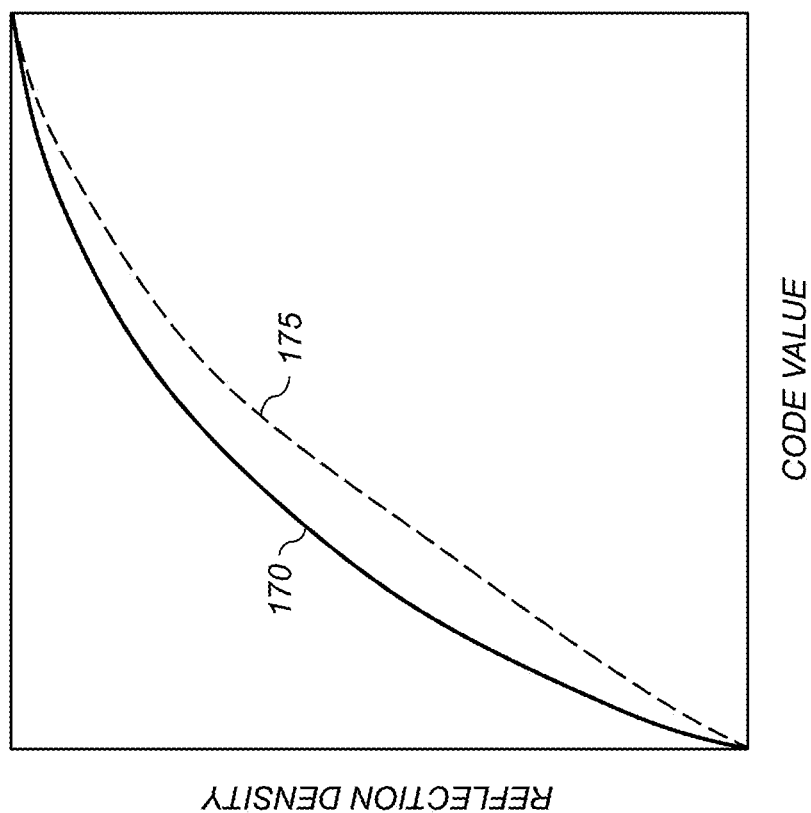
FIG. 3 is a graph illustrating tone reproduction changes that can occur in the vicinity of an edge due to halo artifacts.

As discussed earlier, fringe field effects can cause halo artifacts near edges in an electrophotographic image. Typically, less colorant is deposited on the receiver media on the lighter side of an image edge, and more colorant is deposited on the receiver media on the darker side of an image edge, relative to the colorant that would be deposited in uniform image areas. Halo artifacts can be viewed as a variation of the expected tone reproduction characteristics of the printer in the vicinity of edges in the image. FIG. 3 illustrates a normal tone reproduction curve 170, which shows the reflection density as a function of input code value that is achieved when an exemplary electrophotographic printing system is used to print large solid area patches. A deviated tone reproduction curve 175 shows the change in tone reproduction characteristics for pixels located on the light side of an image edge. It can be seen that the reflection density obtained for a particular input code value is lower for the deviated tone reproduction curve 175 than it is for the normal tone reproduction curve 170.

Figure 4:
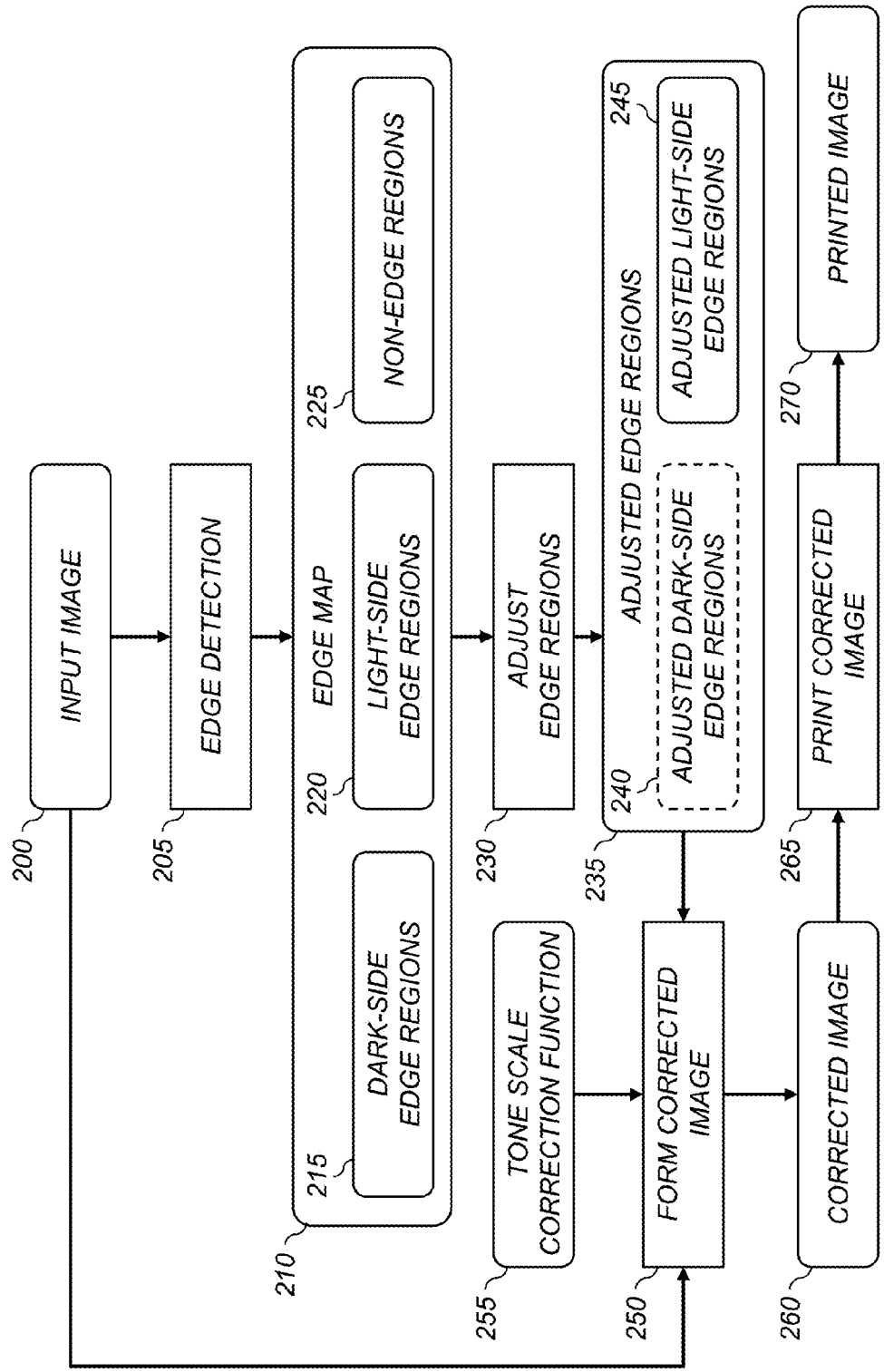
FIG. 4 is a flowchart of a method for correcting halo artifacts according to an exemplary embodiment.

FIG. 4 shows a flowchart of a method for reducing halo artifacts according to a preferred embodiment of the present invention. The method is used to process an input image 200 to determine a corrected image 260 for printing on an electrophotographic printer 20 (FIG. 1). The input image 200 includes a plurality of input pixels having input pixel values. Typically, the input image 200 corresponds to one color channel of a multi-channel image which has been processed according to a normal digital workflow to prepare it for printing. For example, the input image 200 can correspond to a primary color such as cyan, magenta, yellow or black, or some other color channel. In a preferred embodiment, the method of FIG. 4 is applied independently to each of the color channels of the multi-channel color image.

Generally, the input image 200 will be a continuous tone image that is processed at a point in the image processing chain before any halftone operations have been performed. However, the method of the present invention can also be applied to a halftoned image with appropriate adjustments to the parameters.

First, the input image 200 is analyzed using an edge detection step 205 to determine an edge map 210. The edge detection step 205 is automatically performed using a digital processor, such as printer processor 82 (FIG. 1). In a preferred embodiment, the edge map 210 provides an indication of which input pixels in the input image 200 belong to dark-side edge regions 215, light-side edge regions 220 and non-edge regions 225. The dark-side edge regions 215 include input pixels that are adjacent to edge transitions in the input image 200 and are on the darker side of the edge transitions. Similarly, the light-side edge regions 220 include input pixels that are adjacent to edge transitions in the input image 200 and are on the lighter side of the edge transitions. The non-edge regions 225 include input pixels that are not in the dark-side edge regions 215 and the light-side edge regions 220.

The edge detection step 205 can use any edge detection method known in the art to determine the edge map 210. In a preferred embodiment, the edge detection step 205 uses the edge detection method illustrated in FIG. 5. Accordingly, a filter image step 300 is applied to the input image 200 to determine an edge image 305, which provides an indication of the location and strength of edge transitions in the input image 200.

The filter image step 300 can use any of a wide variety of different methods known in the art to determine the edge image 305. Typically, the filter image step 300 includes processing the input image 200 with an appropriate filter 315 (e.g., convolving the input image 200 with a convolution filter). In an exemplary embodiment, the filter 315 is a blur filter (sometimes referred to as a low-pass filter). For example, the filter 315 can be a 5×5 blur filter 316 as shown in FIG. 7A.

Figure 6:
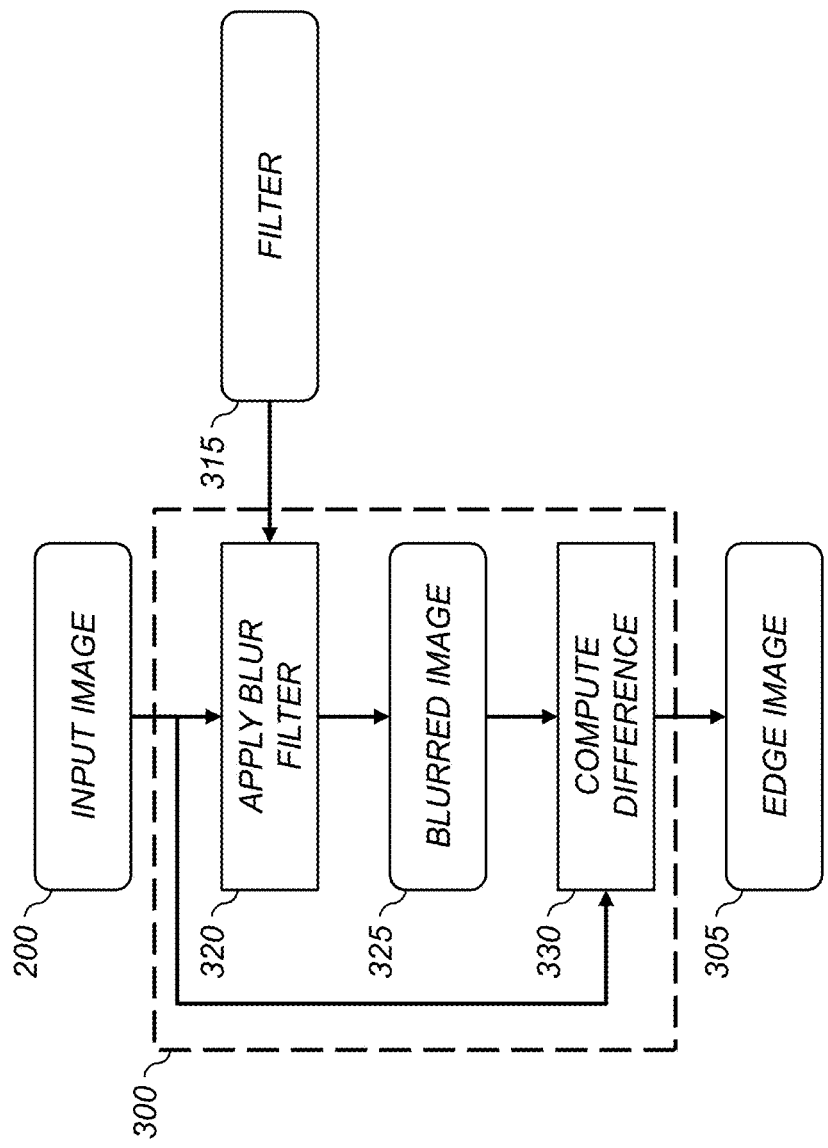
FIG. 6 is a flowchart showing additional details of the filter image step of FIG. 5 according to an exemplary embodiment.

FIG. 6 illustrates additional details of how the filter image step can determine the edge image 305 using a blur filter. This approach is similar to the well-known image processing method called "unsharp masking." In this case, an apply blur filter step 320 convolves the input image 200 with the filter 315 (e.g., blur filter 316) to form a blurred image 325. In equation form, this step is given by:

$$B(x,y)=I(x,y)*F_B(x,y) \qquad (1)$$

where I(x,y) is the input image 200, $F_B(x,y)$ is the blur filter (e.g., blur filter 316), "*" is the convolution operator, and B(x,y) is the blurred image 325.

In a preferred embodiment, the filter 315 is a separable blur filter which includes a 1×7 horizontal blur filter 317 and a 7×1 vertical blur filter 318 as shown in FIG. 7B. In this case, the input image 200 is first convolved with the horizontal blur filter 317, and then is convolved with the vertical blur filter 318. In equation form, this step is given by:

$$B(x,y)=I(x,y)*F_{BH}(x,y)*F_{BV}(x,y) \qquad (2)$$

where $F_{BH}(x,y)$ is the horizontal blur filter 317, and $F_{BV}(x,y)$ is the vertical blur filter 318. Separable blur filters have the advantage that they can be applied using fewer computations than an equivalent two-dimensional blur filter.

A compute difference step 330 is then used to determine the edge image 305 by computing a difference between the input image 200 and the blurred image 325. In equation form, this step is given by:

$$E(x,y)=I(x,y)-B(x,y) \qquad (3)$$

where E(x,y) is the edge image 305. It can be seen that the edge values in the edge image 305 will be positive on the higher code value side of the edge transition, and will be negative on the lower code value side of the edge transition. (In an exemplary embodiment, higher code values in the input image 200 correspond to darker image regions, although this is an arbitrary convention, and it will be obvious to one skilled in the art that the method can easily be adapted to the case where higher code values correspond to lighter image regions.)

Figure 5:
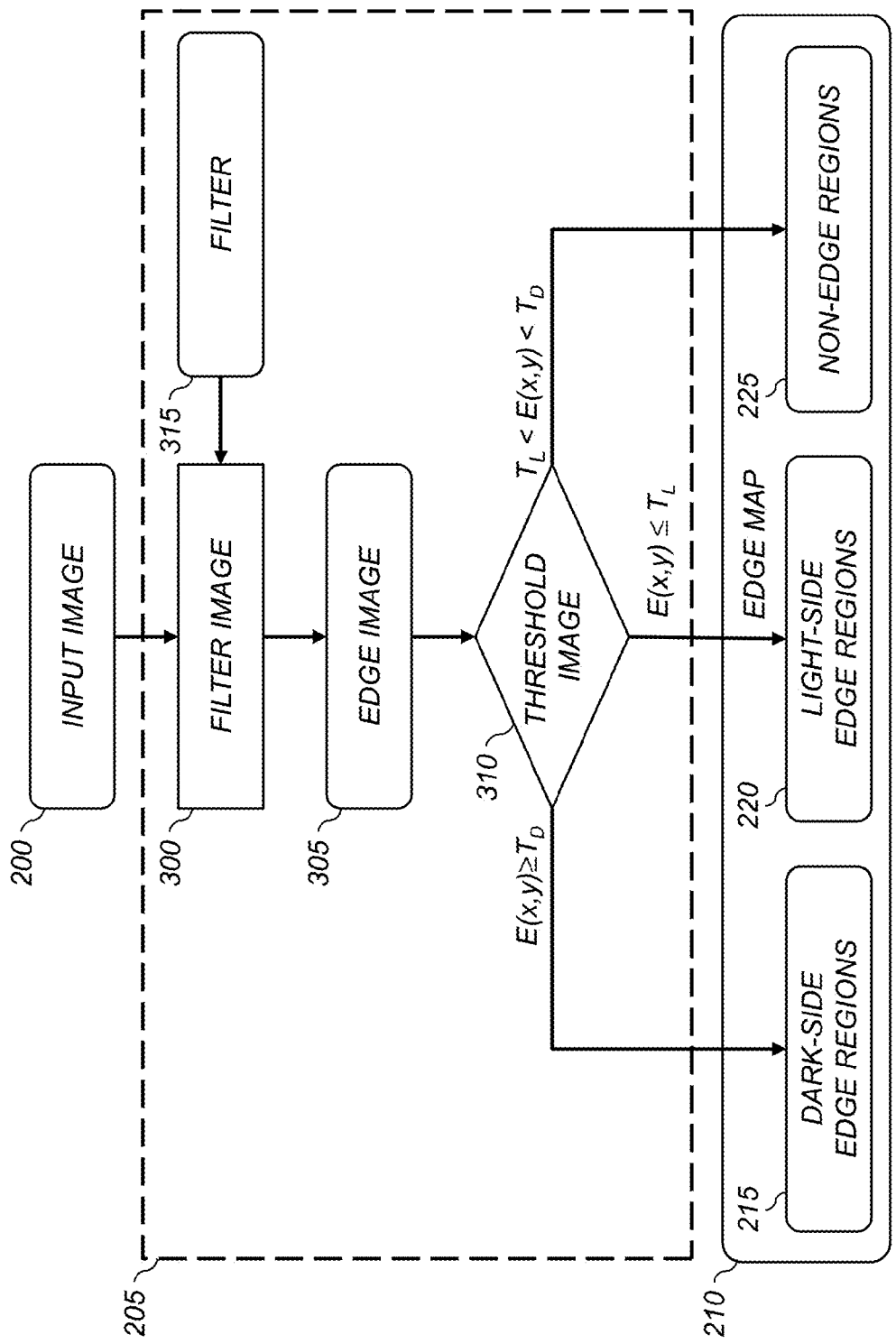
FIG. 5 is a flowchart showing additional details of the edge detection step of FIG. 4 according to an exemplary embodiment.
Figure 7C:
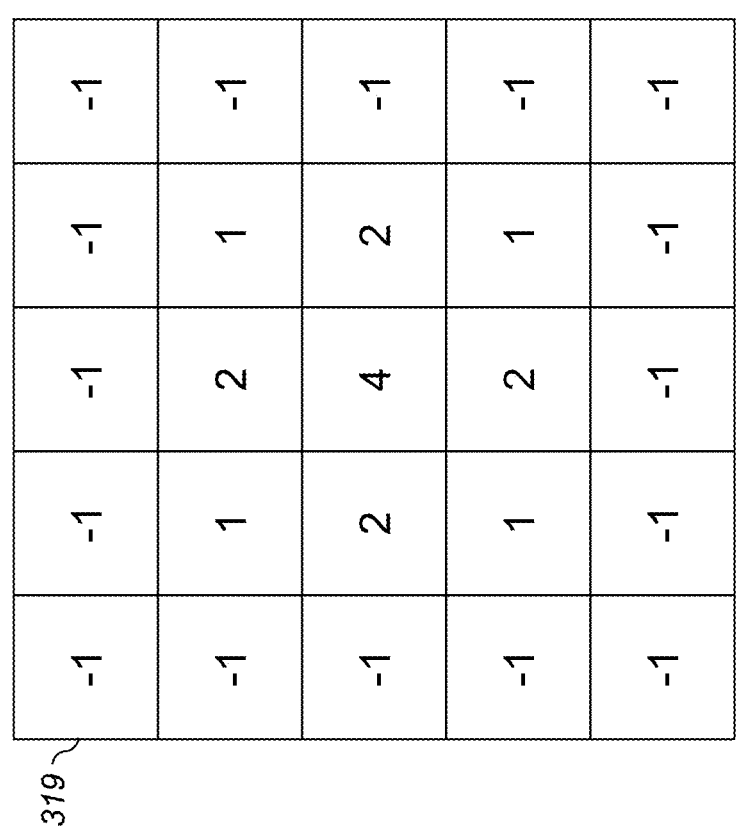

Returning to a discussion of FIG. 5, in other embodiments, the filter image step 300 can also take other forms. For example, the filter 315 can be a high-pass convolution filter which can be convolved with the input image to directly compute the edge image 305. For example, the filter 315 can be a 5×5 high-pass filter 319 as shown in FIG. 7C. In other embodiments, the filter image step 300 can use other well-known edge detection processes such as Sobel edge detectors, Prewitt edge detectors, Frei-Chen edge detectors, Canny edge detectors, Kirsch edge detectors, Robinson edge detectors or Nevatia-Babu edge detectors. These edge detection processes typically involve convolving the input image 200 with one or more filters that compute gradients of the image in various directions.

Next, a threshold image test 310 is applied to the edge image 305 to determine the edge map 210. In a preferred embodiment, the edge image 305 is compared to a first predefined threshold value $T_L$ to identify light-side edge pixels which make up the light-side edge regions 220 (i.e., the image pixels on the lighter side of the edge transitions). For the exemplary case where negative values of the edge image 305 correspond to image pixels on the light side of an edge transition, the threshold value $T_L$ will be a negative number and the light-side edge regions 220 will include those pixels where $E(x,y) \leq T_L$.

The edge image 305 is then compared to a second predefined threshold value $T_D$ to identify dark-side edge pixels which make up the dark-side edge regions 215 (i.e., the image pixels on the darker side of the edge transitions). For the exemplary case where positive values of the edge image 305 correspond to image pixels on the darker side of an edge transition, the threshold value $T_D$ will be a positive number and the dark-side edge regions 215 will include those pixels where $E(x,y) \geq T_D$.

The remaining image pixels that are not in the dark-side edge regions 215 and the light-side edge regions 220 are designated to belong to the non-edge regions 225. The non-edge regions will include those pixels in the edge image 305 where $T_L < E(x,y) < T_D$.

The numerical values of the predefined threshold values $T_L$ and $T_D$ can be determined using any method known in the art. For example, the threshold values can be determined by processing a population of typical images and empirically determining the values that best isolate the edge transitions having magnitudes that produce significant halo artifacts. In an exemplary embodiment, the threshold values are set to $T_L$=−15 and $T_D$=10. However, in other embodiments, any appropriate values can be used.

The edge map 210 can be represented in a variety of different ways. In an exemplary embodiment, the edge map 210 includes an array of edge map pixels corresponding to the image pixels in the input image 200. The edge map pixels are assigned code values according to the type of region to which they belong. For example, the edge map pixels corresponding to the dark-side edge regions 215 are assigned a first code value (e.g., "128"), the edge map pixels corresponding to the light-side edge regions 220 are assigned a second code value (e.g., "255"), and the edge map pixels corresponding to the non-edge regions 225 are assigned a third code value (e.g., "0"). In other embodiments, separate image arrays can be used to store each of the different types of regions (i.e., the dark-side edge regions 215, the light-side edge regions 220, and the non-edge regions 225). In this case, the pixels in the image arrays can be binary values indicating whether or not a particular pixel belongs to the corresponding type or region.

Figure 8:
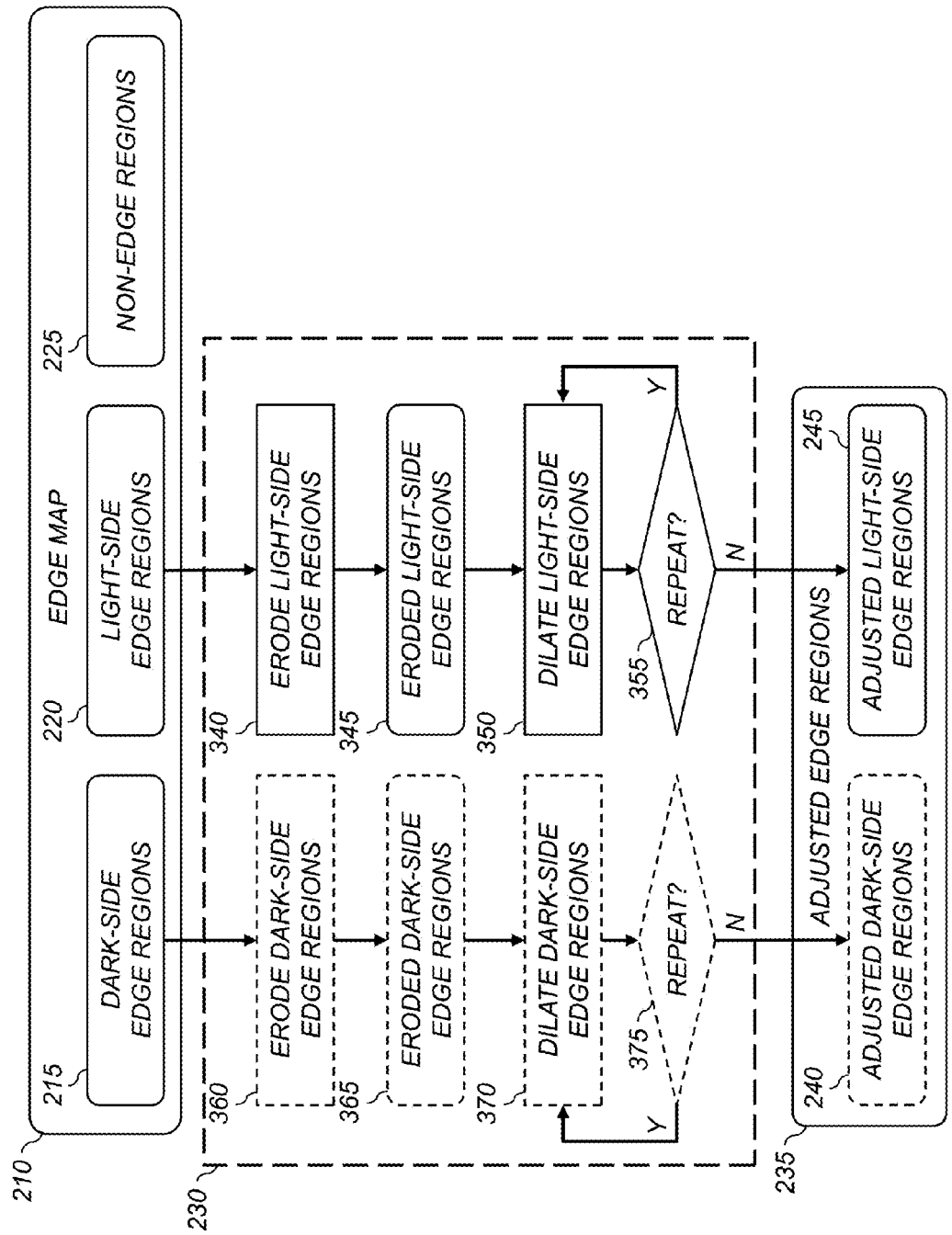
FIG. 8 is a flowchart showing additional details of the adjust edge regions step of FIG. 4 according to an exemplary embodiment.

Returning to a discussion of FIG. 4, once the edge map 210 is determined, an adjust edge regions step 230 is applied to the edge map 210 to determine adjusted edge regions 235. In a preferred embodiment, the adjust edge regions step 230 adjusts at least the light-side edge regions 220 to determine adjusted light-side edge regions 245. In some embodiments, the adjust edge regions step 230 also adjusts the dark-side edge regions 150 to determine adjusted dark-side edge regions 240. The adjust edge regions step 230 can perform a variety of different functions including removing small isolated "edge regions," filling in gaps in the edge regions, and adjusting the widths of the edge regions. FIG. 8 is a flowchart showing additional details of the adjust edge regions step 230 according to an exemplary embodiment. With this method, an erode light-side edge regions step 340 is first used to erode the light-side edge regions 220 to provide eroded light-side edge regions 345. In a preferred embodiment, the erode light-side edge regions step 340 trims off any pixels in the light-side edge regions 220 that are not immediately adjacent to a dark-side edge pixels with no intervening image pixels. One effect of the erode light-side edge regions step 340 is to reduce the light-side edge regions 220 to single pixel wide regions that are immediately adjacent to the corresponding edge transitions in the input image 200. Another effect is to eliminate small isolated regions that were classified as light-side edge regions 220, but which do not correspond to real edge transitions in the input image 200.

Figure 9:
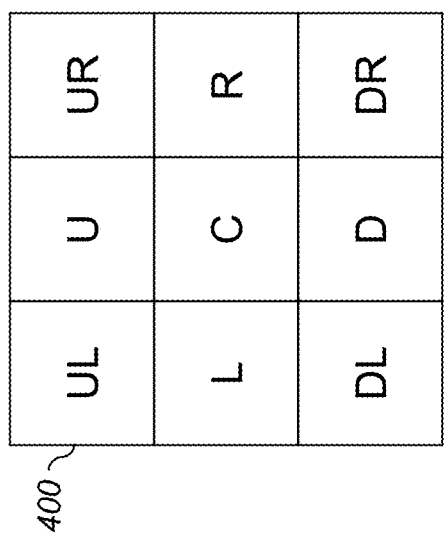
FIG. 9 illustrates an exemplary pixel neighborhood for use in the adjust edge regions step of FIG. 8.

The erode light-side edge regions step 340 can use any appropriate morphological erosion process known in the image processing art. In an exemplary embodiment, each of the light-side edge pixels in the light-side edge regions 220 are processed by examining the states of the pixels in a pixel neighborhood surrounding the light-side edge pixel. An exemplary 3×3 pixel neighborhood 400 is illustrated in FIG. 9. In a preferred embodiment, any light-side edge pixels that are not surrounded on one side by a dark-side edge pixel and on an opposite side by a light-side edge pixel are changed to be non-edge pixels. The process for evaluating a light-side edge pixel (C=LSP) can be represented by the following logic:

if (((UL=DSP) AND (DR=LSP)) OR
   ((UL=LSP) AND (DR=DSP)) OR
   ((U=DSP) AND (D=LSP)) OR
   ((U=LSP) AND (D=DSP)) OR
   ((UR=DSP) AND (DL=LSP)) OR
   ((UR=LSP) AND (DL=DSP)) OR
   ((R=DSP) AND (L=LSP)) OR
   ((R=LSP) AND (L=DSP)))
then
   C'=LSP
else
   C'=NEP where C is the center pixel in the pixel neighborhood 400, UL, U, UR, L, R, DL, D and DR are the surrounding pixels in the pixel neighborhood 400, C' is the adjusted center pixel, DSP corresponds to a dark-side edge pixel state, LSP corresponds to a light-side edge pixel state and NEP corresponds to a non-edge pixel state.

In some embodiments, an analogous erode dark-side edge regions step 360 is optionally applied to the dark-side edge regions 215 to provide eroded dark-side edge regions 365. In this case, a similar logic can be employed that was described earlier with respect to the erode light-side edge regions step 340 where any dark-side edge pixels that are not surrounded on one side by a dark-side edge pixel and on an opposite side by a light-side edge pixel are changed to be non-edge pixels.

After the erode light-side edge regions step 340, the resulting eroded light-side edge regions 345 will include a single pixel wide contour of edge pixels that are immediately adjacent to edge transitions in the input image 200 and are on the lighter side of the edge transitions. Likewise, the dark-side edge regions 215 will optionally include a single pixel wide contour of edge pixels that are immediately adjacent to edge transitions in the input image 200 and are on the darker side of the edge transitions. The halo artifacts often extend for a larger distance than a single image pixel. In an exemplary embodiment, the adjust edge regions step 230 grows the light-side edge regions 220, and optionally the dark-side edge regions 215, so that they have a width corresponding to a typical width of the halo artifacts. The width of the halo artifacts can depend on a number of different factors including the electrophotographic system design, the toner type, the print speed, the dot characteristics of the halftone patterns and the printing resolution (i.e., the dots per inch).

A dilate light-side edge regions step 350 is used to dilate the eroded light-side edge regions 345. Any appropriate morphological dilation operation known in the art can be used in accordance with the present invention. In an exemplary embodiment, the dilate light-side edge regions step 350 expands the eroded light-side edge regions 345 by a single pixel in a direction away from the edge transitions in the input image 200 (FIG. 4). This can be accomplished in a variety of ways. In a preferred embodiment, any non-edge pixel having an immediate neighbor which is a light-side edge pixel is changed to be light-side edge pixel. This process for evaluating a non-edge pixel (C=NEP) can be represented by the following logic:

if ((UL=LSP) OR (U=LSP) OR (UR=LSP) OR
(L=LSP) OR (R=LSP) OR (DL=LSP) OR
(D=LSP) OR (DR=LSP))
then
C'=LSP
else
C'=NEP To achieve a desired width for the adjusted light-side edge regions 245, the dilate light-side edge regions step 350 can be repeated a plurality of times in accordance with the width of the halo artifacts. Each iteration will extend the width of the adjusted light-side edge regions 245 by a single pixel in a direction away from the edge transitions in the input image 200. An iteration test 355 is used to determine whether the dilate light-side edge regions step 350 should be repeated, or whether the iterations are complete. In an exemplary embodiment, the dilate light-side edge regions step 350 is repeated 3x so that the width of the adjusted light-side edge regions 245 is increased to 4 pixels.

In some cases, the fringe field effects and the characteristics of the corresponding halo artifacts may be different in the in-track and cross-track directions. In this case, it may be desirable to dilate the eroded light-side edge regions 345 more in one direction (e.g., the in-track direction) than in the other direction (e.g., the cross-track direction). One way to accomplish this is to modify the logic of the dilation process for one or more iterations so that it only checks the neighboring pixels in one direction of the pixel neighborhood 400 (e.g., pixels U and D).

In some embodiments, an analogous dilate dark-side edge regions step 370 and iteration test 375 are optionally applied to the eroded dark-side edge regions 365 to provide the adjusted dark-side edge regions 240. In this case, a similar logic can be employed that was described earlier with respect to the dilate light-side edge regions step 350 where any non-edge pixel having an immediate neighbor which is a dark-side edge pixel is changed to be dark-side edge pixel.

The process of eroding the edge regions down to a single pixel width, and then using a series of dilation operations to increase the width of the edge regions has the advantage that the resulting adjusted light-side edge regions 245 and adjusted dark-side edge regions 240 will have consistent and controllable widths. The widths are preferably controlled according to the characteristics of the halo artifacts associated with a particular printing configuration.

Once the adjusted edge regions 235 are determined, a form corrected image step 250 is used to determine a corrected image 260 by modifying the image pixels in the adjusted edge regions 235. In some embodiments, corrections are only to those pixels in the adjusted light-side edge regions 245, while in other embodiments corrections are applied to both the adjusted dark-side edge regions 240 and the adjusted light-side edge regions 245. Since the halo artifacts are typically less objectionable on the darker side of the edge transitions, the correction of the adjusted dark-side edge regions 240 is not always necessary to obtain acceptable image quality.

In a preferred embodiment, the image pixels in the input image 200 corresponding to the adjusted light-side edge regions 245 are corrected using a tone scale correction function 255 that darkens the image pixels to compensate for the halo artifacts which cause the image pixels on the lighter side of edge transitions to be reproduced with a lower density than desired.

Figure 10:
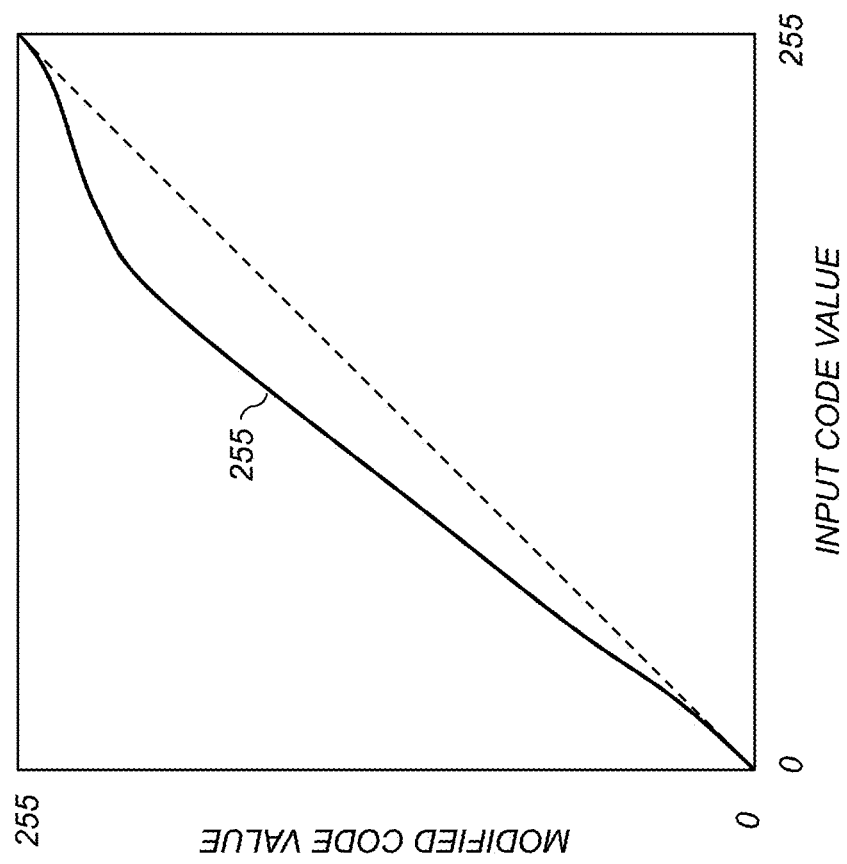
FIG. 10 is a graph illustrating an exemplary tone scale correction function.

FIG. 10 shows an exemplary tone scale correction function 255 which can be used to determine modified code values for the corrected image 260 as a function the input code values of the input image 200. The exact form of the tone scale correction function 255 will depend on the characteristics of the printer 20, and can be determined using any method known in the art. For example, the normal tone reproduction curve 170 and the deviated tone reproduction curve 175 (see FIG. 3) can be measured to characterize the amount of density loss associated with the halo artifacts. Then, for a given input code value, a modified code value can be determined that will produce the same density in the deviated tone reproduction curve 175 that the input code value produces in the normal tone reproduction curve 170. In some embodiments, the tone scale correction function 255 can be determined using an empirical process where the shape of the tone scale correction function 255 is adjusted until acceptable results are obtained. In some embodiments, different tone scale correction functions 255 can be used for different system configurations that would affect the characteristics of the halo artifacts (e.g., for different halftone patterns or different print speeds). When the present invention is applied to a color printing system, it may be desirable to apply different tone scale correction functions 255 for different color channels to account according to the corresponding halo artifact characteristics.

The tone scale correction function 255 can be stored using any means known in the art. In a preferred embodiment, the tone scale correction function 255 is stored using a one-dimensional look-up table (1-D LUT) which stores modified code values as a function of the input code value. In some embodiments, the 1-D LUT can be store modified code values for all possible input code values. In other embodiments, the 1-D LUT can be store modified code values for a subset of the input code values and interpolation can be used to determine modified code values for intermediate input code values. In other embodiments, the tone scale correction function 255 can be represented using other methods such as a set of parameters describing a polynomial, a spline function, or some other type of parametric function.

In some embodiments, the tone scale correction function 255 can be a two-dimensional function that determines the modified code values for the corrected image 260 as a function of both the input code value of the input image 200 as well the edge strength, for example as characterized by the corresponding pixel values of the edge image 305 (FIG. 5).

For embodiments where form corrected image step 250 modifies the image pixels corresponding to the adjusted dark-side edge regions 240, a corresponding tone scale correction function 255 should be used which lightens the image pixels to compensate for the halo artifacts which cause the image pixels on the darker side of edge transitions to be reproduced with a higher density than desired. The tone scale correction function 255 to be applied in the adjusted dark-side edge regions 240 can be determined using a manner analogous to that used to determine the tone scale correction function 255 to be applied in the adjusted light-side edge regions 245.

Once the corrected image 260 has been determined, a print corrected image step 265 is used to form the printed image 270 using the normal print process of the printer 20 (FIG. 1). The resulting printed image 270 will have reduced halo artifacts relative to the image that would be formed if the input image 200 were printed directly.

The computations involved in the formation of the corrected image 260 are efficient enough so that they can be performed in real time by a data processing system (e.g., printer processor 82) in the printer 20.

Figure 11:
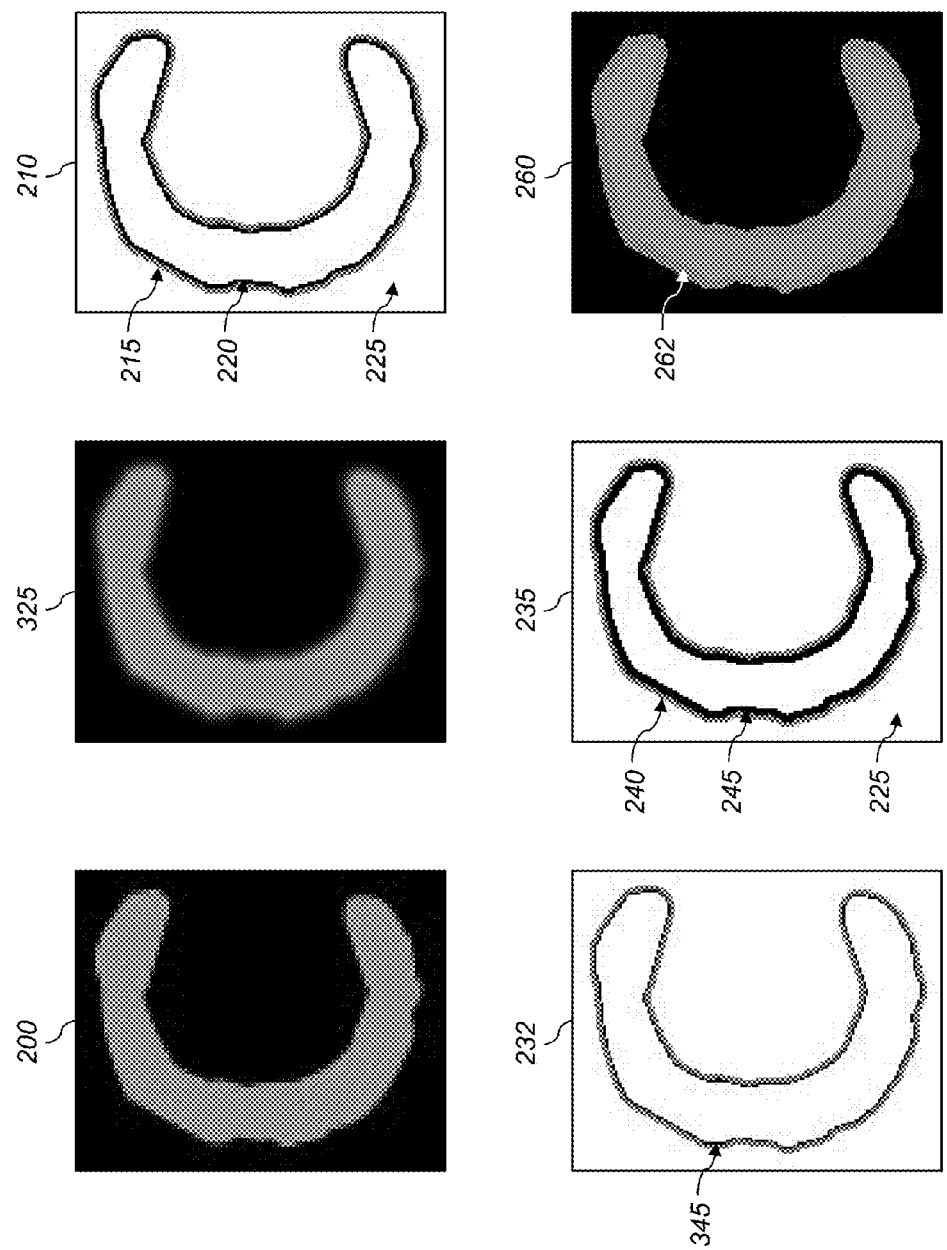
FIG. 11 illustrates a magnified portion of an exemplary input image being processed in accordance with the present invention.

FIG. 11 shows a magnified portion of an input image 200, which is processed according to the method of the present invention to provide a corrected image 260. Corresponding intermediate images are also shown at various points along the image processing path. The illustrated portion of the input image 200 includes a letter "C" having an intermediate code value positioned on a dark background.

Blurred image 325 illustrates the result obtained from the apply blur filter step 320 (FIG. 6), using the horizontal blur filter 317 and the vertical blur filter 318 of FIG. 7B.

Edge map 210 shows the dark-side edge regions 215, the light-side edge regions 220 and the non-edge regions 225 determined using the edge detection step 205 of FIG. 5. The light-side edge regions 220 correspond to the pixels adjacent to the edges of the letter "C" on the lighter side of the edge transition, and the dark-side edge regions 225 correspond to the pixels adjacent to the edges of the letter "C" on the darker side of the edge transition.

Intermediate adjusted edge regions 232 illustrates the results of applying the erode light-side edge regions step 340 (FIG. 8) to obtain eroded light-side edge regions 345. It can be seen that the light-side edge regions 220 in the edge map 210 have been thinned to have a single-pixel width in the eroded light-side edge regions 345.

Adjusted edge regions 235 illustrates the results of applying the final results of the adjust edge regions step 230 (FIG. 8) where the dilate light-side edge regions step 250 has been applied twice to the intermediate adjusted edge regions 232. The adjusted edge regions 235 include adjusted dark-side edge regions 240 (which in this case are identical to the dark-side edge regions 215) and adjusted light-side edge regions 245. It can be seen that the eroded light-side edge regions 345 in the intermediate adjusted edge regions 232 have been dilated to be three pixels wide in the adjusted light-side edge regions 245.

Corrected image 260 illustrates the result of applying the form corrected image step 250 (FIG. 4). It can be seen that the image pixels corresponding to the adjusted light-side edge regions 245 have been darkened to provide corrected light-side image regions 262. Printing the corrected image 260 will have the result of producing reduced halo artifacts relative to those that would have been formed if the input image 200 were printed directly.

The invention has been described in detail with particular reference to certain preferred embodiments thereof, but it will be understood that variations and modifications can be effected within the spirit and scope of the invention.

PARTS LIST 20 printer
22 print engine
24 toner
25 toner image
26 receiver
27 composite toner image
28 receiver transport system
30 moveable surface
32 receiver delivery system
36 motor
38 roller
40 printing module
42 printing module
44 printing module
46 printing module
48 printing module
50 transfer subsystem
52 cleaning system
60 fuser
70 toner print
74 finishing system
82 printer processor
84 user input system
86 sensors
88 memory
90 communication system
92 external devices
94 output system
96 color separation processor
98 halftone processor
100 source of print order information
109 arrow
110 primary imaging system
112 primary imaging member
114 surface
120 charging subsystem
130 writing system
140 development system
156 transfer nip
158 cleaning subsystem
160 transfer backup member
162 intermediate transfer member
164 transfer surface
166 transfer nip
168 transfer power supply
170 normal tone reproduction curve
175 deviated tone reproduction curve
200 input image
205 edge detection step
210 edge map
215 dark-side edge regions
220 light-side edge regions
225 non-edge regions
230 adjust edge regions step
232 intermediate adjusted edge regions
235 adjusted edge regions
240 adjusted dark-side edge regions
245 adjusted light-side edge regions
250 form corrected image step
255 tone scale correction function
260 corrected image
262 corrected light-side image regions
265 print corrected image step
270 printed image
300 filter image step
305 edge image
310 threshold image test
315 filter
316 blur filter
317 horizontal blur filter
318 vertical blur filter
319 high-pass filter 320 apply blur filter step
325 blurred image
330 compute difference step
340 erode light-side edge regions step
345 eroded light-side edge regions
350 dilate light-side edge regions step
355 iteration test
360 erode dark-side edge regions step
365 eroded dark-side edge regions
370 dilate dark-side edge regions step
375 iteration test
400 pixel neighborhood

The invention claimed is:

1. A method for reducing halo artifacts in an electrophotographic printing system, the method implemented at least in part by a data processing system and comprising:
receiving an input image including a plurality of input pixels having input pixel values;
automatically analyzing the input image to determine an edge map image indicating light-side edge regions that include edge pixels that are adjacent to edge transitions in the input image and are on a lighter side of the edge transition;
performing at least one edge region dilation operation to the edge map image to expand the light-side edge regions in a direction away from the edge transitions thereby providing expanded light-side edge regions;
forming a corrected image by modifying the input pixels of the input image corresponding to the expanded light-side edge regions to determine corrected pixels having corrected pixel values; and
printing the corrected image using the electrophotographic printing system.

2. The method of claim 1 wherein the step of analyzing the input image includes:
performing an edge detection operation on the input image to detect edge pixels that are in proximity to edge transitions in the input image, wherein the edge pixels are classified as either dark-side edge pixels corresponding to the input pixels on a darker side of the edge transition or light-side edge pixels corresponding to the input pixels on the lighter side of the edge transition, and wherein the input pixels in the input image that are not edge pixels are classified as non-edge pixels;
designating the classified light-side edge pixels as belonging to the light-side edge regions; and
designating the classified dark-side edge pixels as belonging to dark-side edge regions.

3. The method of claim 2 wherein the edge detection operation includes:
forming a filtered image, wherein the formation of the filtered image includes convolving the input image with a convolution filter;
comparing the pixels in the filtered image to a first predefined threshold value to identify the light-side edge pixels; and
comparing the pixels in the filtered image to a second predefined threshold value to identify the dark-side edge pixels.

4. The method of claim 3 wherein the convolution filter is a blur filter, and wherein the formation of the filtered image includes:
convolving the input image with the blur filter to form a blurred image; and
forming the filtered image by computing a difference between the input image and the blurred image.

5. The method of claim 3 wherein the convolution filter is a high-pass filter and wherein the formation of the filtered image includes convolving the input image with the high-pass filter to form the filtered image.

6. The method of claim 2 further including applying an edge region erosion operation to remove pixels from the light-side edge regions, the edge region erosion operation being performed before the at least one edge region dilation operation.

7. The method of claim 6 wherein the edge region erosion process includes removing any light-side edge pixels from the light-side edge regions that are not immediately adjacent to a dark-side edge pixel on one side and to another light-side edge pixel on an opposite side.

8. The method of claim 2 wherein the edge region dilation operation includes designating any non-edge pixels that are immediately adjacent to a light-side edge pixel to belong to the expanded light-side edge regions.

9. The method of claim 1 wherein the edge region dilation operation expands the light-side edge regions by one pixel, and wherein the edge region dilation operation is applied a plurality of times to expand the light-side edge regions by a corresponding number of pixels.

10. The method of claim 1 wherein the corrected pixels are determined by addressing a tone scale correction function with the input pixel value of the corresponding input pixel in the input image.

11. The method of claim 1 wherein the tone scale correction function is a two-dimensional function which is addressed by both the input pixel value of the corresponding input pixel in the input image and an edge strength value providing an indication of the magnitude of the edge transition associated with the corresponding input pixel in the input image.

12. The method of claim 1 wherein the corrected pixel values for the corrected pixels in the expanded light-side edge regions are darker the corresponding input pixel values.

13. The method of claim 1 wherein the edge map image stores an array of edge map pixels corresponding to the input pixels in the input image, the edge map pixels having a first code value for edge map pixels corresponding to image pixels belonging to the light-side edge regions, and a different code value for edge map pixels corresponding to image pixels belonging to non-edge regions.

14. The method of claim 1 wherein the amount of expansion of the light-side edge regions provided by the at least one edge region dilation operation in an in-track direction and is different than in a cross-track direction.

15. The method of claim 1 wherein the edge map image further indicates dark-side edge regions that include edge pixels that are adjacent to the edge transitions in the input image and are on a darker side of the edge transition, and wherein the formation of the corrected image further includes modifying the input pixels of the input image corresponding to the dark-side edge regions to determine corrected pixels having corrected pixel values.

16. The method of claim 15 further including performing at least one edge region dilation operation to the edge map image to expand the dark-side edge regions in a direction away from the edge transitions.

17. The method of claim 15 wherein the corrected pixel values for the corrected pixels in the dark-side edge regions are lighter the corresponding input pixel values.

18. The method of claim 15 wherein the edge map image stores an array of edge map pixels corresponding to the input pixels in the input image, the edge map pixels having a first code value for edge map pixels corresponding to image pixels belonging to the light-side edge regions, a second code value for edge map pixels corresponding to image pixels belonging to the dark-side edge regions, and a third code value for edge map pixels corresponding to image pixels belonging to non-edge regions.

* * * * *